US011212505B2

(12) United States Patent
Lee et al.

(10) Patent No.: US 11,212,505 B2
(45) Date of Patent: Dec. 28, 2021

(54) METHOD AND APPARATUS FOR IMMERSIVE VIDEO FORMATTING

(71) Applicant: ELECTRONICS AND TELECOMMUNICATIONS RESEARCH INSTITUTE, Daejeon (KR)

(72) Inventors: Gwang Soon Lee, Daejeon (KR); Hong Chang Shin, Daejeon (KR); Kug Jin Yun, Daejeon (KR); Jun Young Jeong, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/777,935

(22) Filed: Jan. 31, 2020

(65) Prior Publication Data

US 2020/0336724 A1    Oct. 22, 2020

(30) Foreign Application Priority Data

Jan. 31, 2019  (KR) .................. 10-2019-0012883
Apr. 30, 2019  (KR) .................. 10-2019-0050448
Jan. 30, 2020  (KR) .................. 10-2020-0010892

(51) Int. Cl.
*H04N 13/161* (2018.01)
*H04N 13/268* (2018.01)
*H04N 13/128* (2018.01)
*H04N 13/178* (2018.01)

(52) U.S. Cl.
CPC ......... *H04N 13/161* (2018.05); *H04N 13/128* (2018.05); *H04N 13/178* (2018.05); *H04N 13/268* (2018.05)

(58) Field of Classification Search
CPC .. H04N 13/161; H04N 13/268; H04N 13/128; H04N 13/178
See application file for complete search history.

(56) References Cited

U.S. PATENT DOCUMENTS

2012/0122062 A1    5/2012  Yang et al.
2012/0229602 A1*   9/2012  Chen .................... H04N 19/597
                                                    348/43

(Continued)

FOREIGN PATENT DOCUMENTS

KR    10-2018-0029473 A    3/2018
KR    10-2018-0040507 A    4/2018

OTHER PUBLICATIONS

"Call for Proposals on 3DoF+ Visual", *International Organization For Standardization Organisation Internationale De Normalisation* Iso/Iec Jtc1/Sc29/Wg11 *Coding Of Moving Pictures and Audio*, Jan. 2019 (pp. 1-18).

*Primary Examiner* — Jonathan R Messmore
(74) *Attorney, Agent, or Firm* — NSIP Law

(57) ABSTRACT

Disclosed herein is an immersive video formatting method and apparatus for supporting motion parallax, The immersive video formatting method includes acquiring a basic video at a basic position, acquiring a multiple view video at at least one position different from the basic position, acquiring at least one residual video plus depth (RVD) video using the basic video and the multiple view video, and generating at least one of a packed video plus depth (PVD) video or predetermined metadata using the acquired basic video and the at least one RVD video.

9 Claims, 7 Drawing Sheets

(56) References Cited

U.S. PATENT DOCUMENTS

| | | | |
|---|---|---|---|
| 2013/0294682 A1* | 11/2013 | Yamashita | H04N 13/122 382/154 |
| 2014/0098883 A1* | 4/2014 | Hannuksela | H04N 19/80 375/240.16 |
| 2015/0264398 A1* | 9/2015 | Bang | H04N 13/161 375/240.12 |
| 2015/0317057 A1 | 11/2015 | Choi et al. | |
| 2015/0341614 A1* | 11/2015 | Senoh | H04N 13/161 348/43 |
| 2018/0090008 A1* | 3/2018 | Ikenouchi | G08G 1/166 |
| 2019/0291642 A1* | 9/2019 | Chae | B60R 1/00 |

* cited by examiner

METHOD AND APPARATUS FOR IMMERSIVE VIDEO FORMATTING

CROSS REFERENCE TO RELATED APPLICATION

The present application claims priority to Korean Patent Application Nos. 10-2019-0012883 filed Jan. 31, 2019, 10-2019-0050448 filed Apr. 30, 2019, and 10-2020-0010892 filed Jan. 30, 2020, the entire contents of which is incorporated herein for all purposes by this reference.

BACKGROUND OF THE INVENTION

1. Field of the Invention

The present invention relates to an immersive video formatting method and apparatus for supporting motion parallax. Specifically, the present invention relates to a video formatting method and apparatus for providing an omnidirectional video capable of supporting motion parallax in correspondence with not only left/right and up/down rotation of a viewer but also left/right and up/down movement of the viewer.

2. Description of the Related Art

A virtual reality (VR) service generates a 360-degree omnidirectional video (or an omnidirectional video or a 360-degree video) in the form of an actual image or computer graphics (CG) and plays the video on a head mounted display (HMD) or a smartphone which is a personal VR terminal, and has evolved to maximize immersion and realism.

In the current study, six degrees of freedom (6DoF) need to be reproduced in order to play a natural, immersive 360-degree video through an HMD. That is, an image which is gazed with respect to movement of a viewer in six directions such as (1) left/right movement, (2) up/down rotation, (3) up/down movement and (4) left/right rotation is played through the HMD. A current omnidirectional video which produces an actual image captured by a camera has 3DoF, in which an image is played by detecting movement mainly including (2) up/down rotation and (4) left/right rotation. Therefore, an image which is gazed with respect to left/right movement and up/down movement of the viewer is not provided.

In the MPEG standardization group, a media for maximizing immersion is defined as an immersive media, and the standard for effective encoding and transmission of an immersive video proceeds in stages. Specifically, as the next step of 3DoF of the most basic immersive video, standardization processes including 3DoF+ of an immersive video capable of reproducing motion parallax in an environment in which a viewer is seated, omnidirectional 6DoF for providing motion parallax corresponding to several footsteps of a viewer, and 6DoF for providing complete motion parallax according to free motion of a viewer will proceed in stages. When the immersive video uses an omnidirectional video of multiple views (e.g., an ERP (Equi-Rectangular Projection) format, a cubemap format, etc.), windowed-6DoF may be similar to a multi-view video technology having a conventional horizontal/vertical parallax. Here, Windowed-6DoF refers to a technology for providing motion parallax through a single viewing window using a planar video (e.g., HD, UHD, etc.) of several views.

SUMMARY OF THE INVENTION

Accordingly, the present invention has been made keeping in mind the above problems occurring in the prior art.

An object of the present invention is to provide an immersive video formatting method and apparatus capable of supporting motion parallax.

Another object of the present invention is to provide an immersive video formatting method and apparatus for playing a natural omnidirectional video through a VR terminal.

According to the present invention, there is provided an immersive video formatting method including acquiring a basic video at a basic position, acquiring a multiple view video at at least one position different from the basic position, acquiring at least one residual video plus depth (RVD) video using the basic video and the multiple view video, and generating at least one of a packed video plus depth (PVD) video or predetermined metadata using the acquired basic video and the at least one RVD video.

The basic video may be at least one of a planar video or an omnidirectional video.

The basic video may be acquired at least two positions having a minimum mutual overlapping region and capable of acquiring a video in a widest range.

The multiple view video may include a first multiple view video acquired at a first position and a second multiple view video acquired at a second position different from the first position, and the RVD video may include a first RVD video derived from the first multiple view video and a second RVD video derived from the second multiple view video.

The first RVD video may include a region, which does not overlap the basic video, in the first multiple view video.

The second RVD video may include a region, which does not overlap the basic video and the first RVD video, in the first multiple view video.

A plurality of RVD videos may be included, and the PVD video may be a frame generated by packing a region included in each RVD video.

The PVD video may be packed based on a predetermined packing position, and the packing position may be derived from region information acquired using the RVD video.

The metadata may include at least one of a view position (view number) of each video region, a shared view position (shared views), priority, region information in RVD, region information in PVD or a camera parameter of each view position.

In addition, according to the present invention, there is provided an immersive video formatting method including decoding a packed video plus depth (PVD) video and predetermined metadata from a bitstream, acquiring at least one residual video plus depth (RVD) video from the PVD using the metadata, and generating a video at a viewport using the acquired RVD video and a basic video.

The metadata may include at least one of a view position (view number) of each video region, a shared view position (shared views), priority, region information in RVD, region information in PVD or a camera parameter of each view position.

When the metadata does not include the shared view position, the shared view position may be derived using at least one of the camera parameter, the region information in RVD or the region information in PVD.

In addition, according to the present invention, there is provided an immersive video formatting apparatus including a reception unit configured to acquire a basic video at a basic position and acquire a multiple view video at at least one position different from the basic position, and an additional information formatting unit configured to acquire at least one residual video plus depth (RVD) video using the basic video and the multiple view video. The additional information formatting unit may generate at least one of a packed video plus depth (PVD) video or predetermined metadata using the acquired basic video and the at least one RVD video.

The basic video may be at least one of a planar video or an omnidirectional video.

The basic video may be acquired at least two positions having a minimum mutual overlapping region and capable of acquiring a video in a widest range.

The multiple view video may include a first multiple view video acquired at a first position and a second multiple view video acquired at a second position different from the first position, and the RVD video may include a first RVD video derived from the first multiple view video and a second RVD video derived from the second multiple view video.

A plurality of RVD videos may be included, and the PVD video may be a frame generated by packing a region included in each RVD video.

The PVD video may be packed based on a predetermined packing position, and the packing position may be derived from region information acquired using the RVD video.

The metadata may include at least one of a view position (view number) of each video region, a shared view position (shared views), priority, region information in RVD, region information in PVD or a camera parameter of each view position.

The priority may be at least one of an order of views indicating a relative degree of illumination of each view position or an order of target views or reference views when a non-overlapping video region is extracted.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
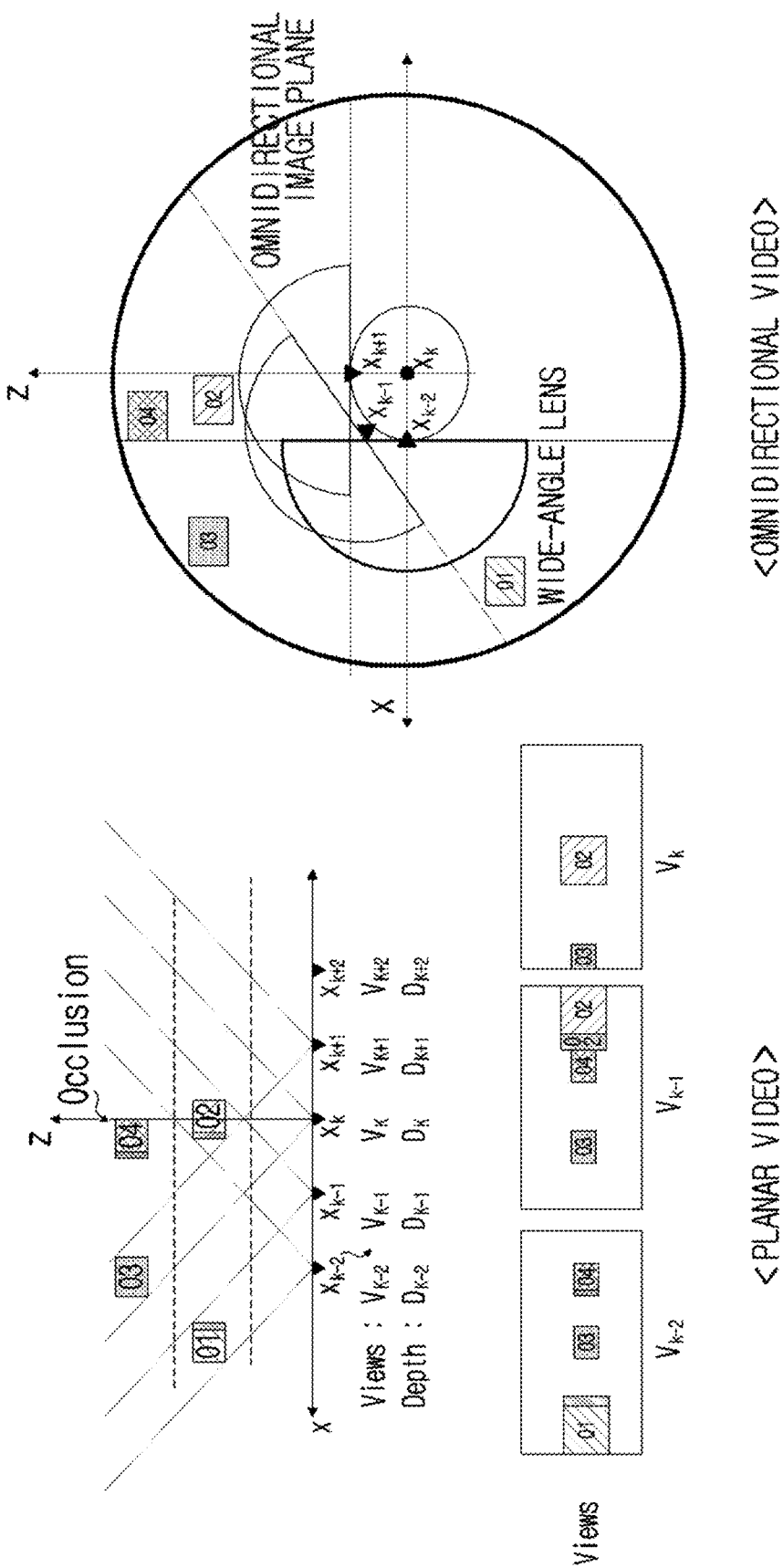
FIG. 1 is a view illustrating the concept of an immersive video according to an embodiment of the present invention.

Hereinbelow, exemplary embodiments of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure. Further, parts not related to description of the present disclosure are not shown in the drawings and like reference numerals are given to like components.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Hereinafter, embodiments of the present invention will be described in detail with reference to the accompanying drawings.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

FIG. 1 is a view illustrating the concept of an immersive video according to an embodiment of the present invention.

Referring to FIG. 1, object 1 (O1) to object 4 (O4) respectively denote video regions in an arbitrary scene, $V_k$ denotes a video (a base video or a basic video) acquired at a camera center position, $X_k$ denotes a viewing position (camera position), and $D_k$ denotes depth information at the camera center position. An immersive video may be generated using the basic video $V_k$ visible at the center position (or the central position or the basic position) $X_k$, multiple view videos $V_{k-2}$, $V_{k-1}$, ... at multi-view positions $X_{k-2}$, $X_{k-1}$, ... visible when a viewer moves, and related space information (e.g., depth information or camera information), and may be transmitted to a terminal through video compression and packet multiplexing, in order to support six degrees of freedom according to movement of the viewer. Here, the basic video and/or the multiple view video may be a planar video or an omnidirectional video.

Accordingly, since an immersive media system should acquire, generate, transmit and reproduce a large amount of immersive video of multiple views, a large amount of video data needs to be effectively stored and compressed and compatibility with an existing immersive video (3DoF) needs to be maintained.

An immersive video formatting apparatus may acquire a basic video, a multiple view video, etc. and a reception unit (not shown) may perform the above operation.

Figure 2A:
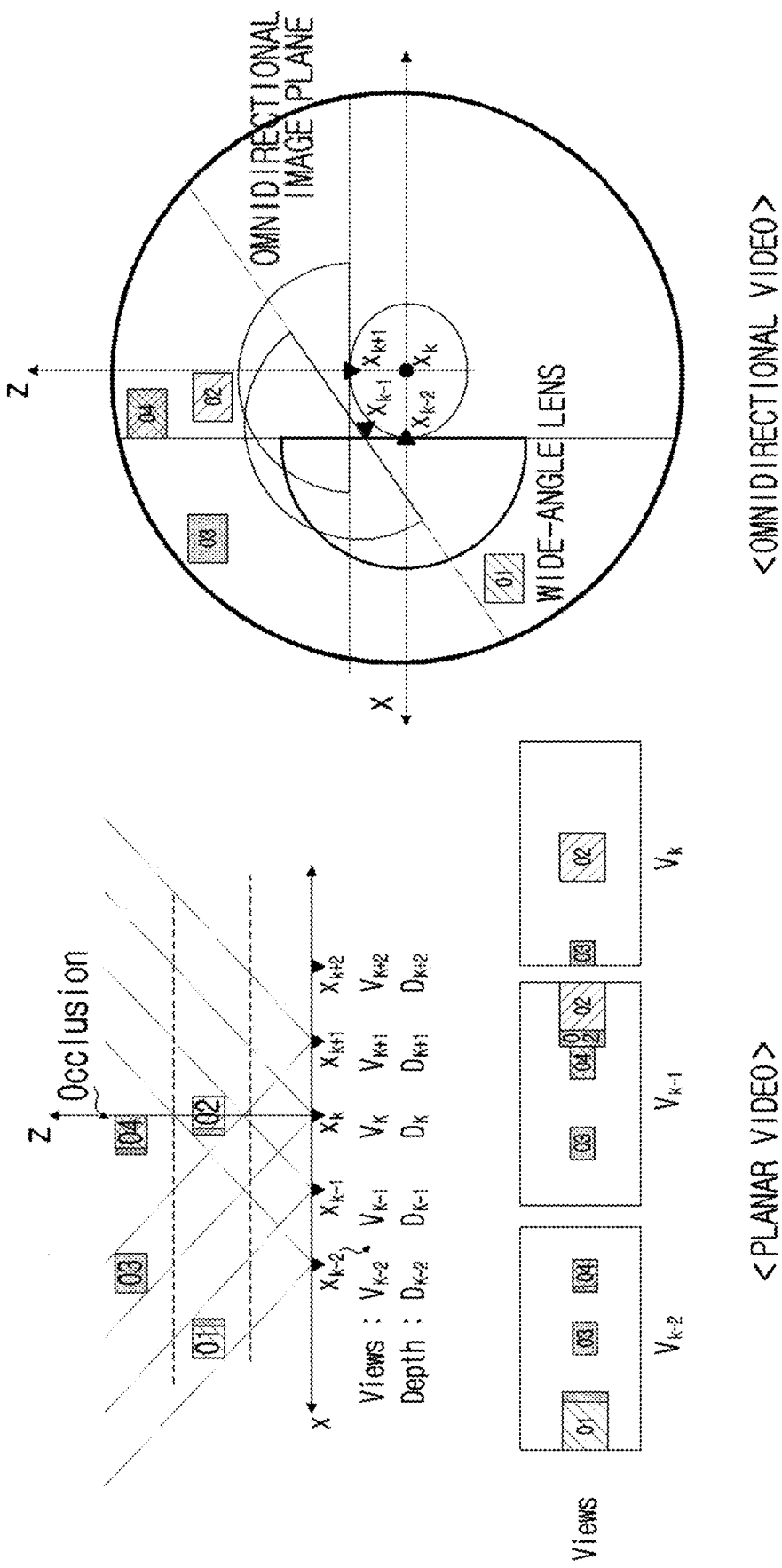
FIGS. 2a and 2b are views illustrating a process of generating an immersive video according to an embodiment of the present invention.
Figure 2B:
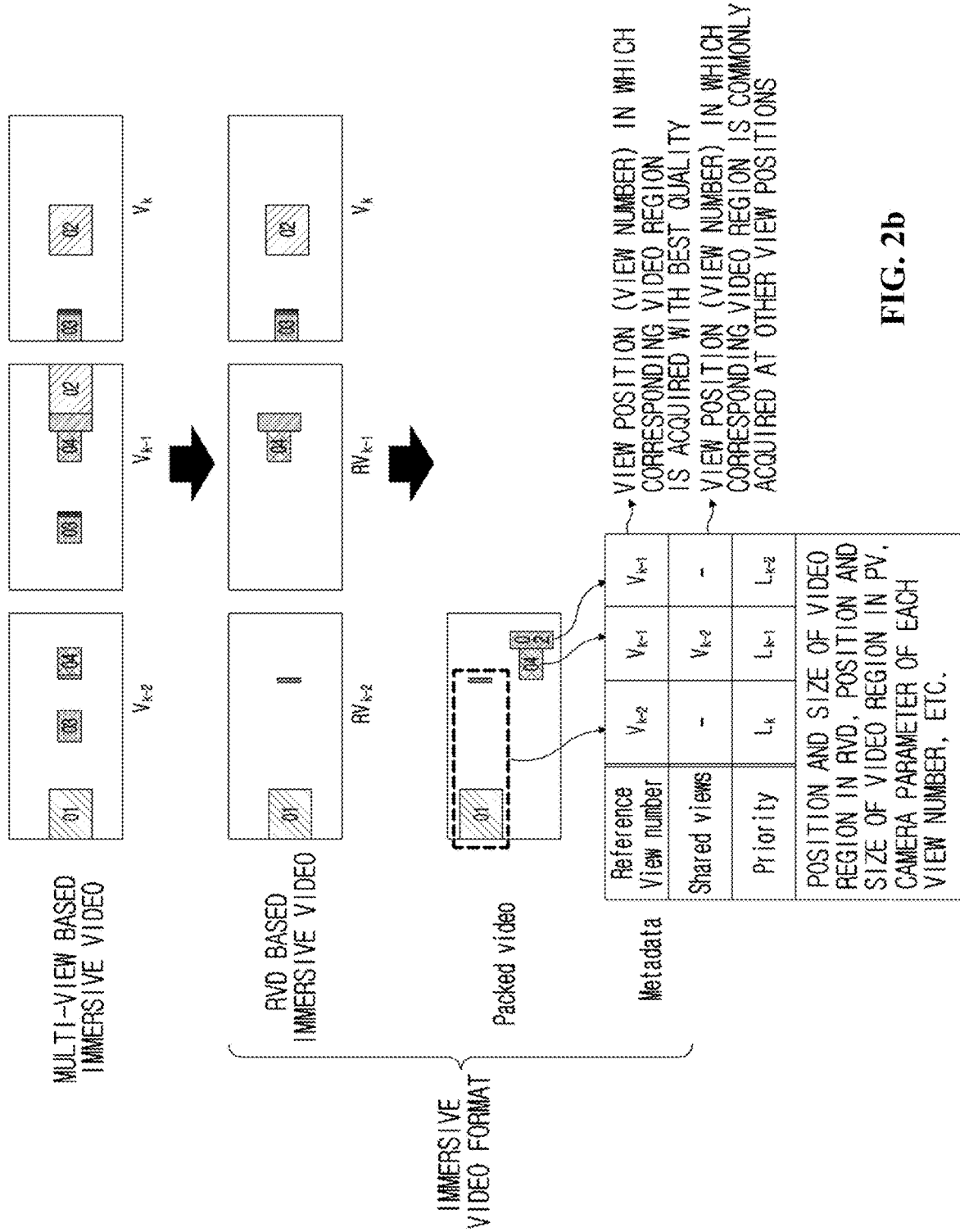

FIGS. 2a and 2b are views illustrating a process of generating an immersive video according to an embodiment of the present invention.

In the present invention, the basic video $V_k$ is to maintain compatibility with a basic service, may correspond to a 2D video in Windowed-6DoF based on a planar video and may correspond to a 3DoF 360VR video in 3DoF+ and 6DoF based on an omnidirectional video.

In addition, in the present invention, RVD (Residual Video plus Depth) $RV_{k-2}$, $RV_{k-1}$, ... is additional videos for supporting motion parallax as minimum additional data. The RVD may be composed of a video generated except for an overlapping region in the immersive video acquired at all viewing positions $X_{k-2}$, $X_{k-1}$, ... and/or a depth map. The basic video $V_k$ may be composed of a region acquired at the center position of a viewer (in FIGS. 2a and 2b, a video region connected with an arrow from $X_k$) as reference video.

Alternatively, the basic video may be videos acquired at two or more positions having a minimum mutual overlapping region and capable of acquiring an omnidirectional video in a widest range or a synthesized video obtained by synthesizing the acquired videos. RV (Residual Video) may mean a pruned video.

$RV_{k-1}$ configuring the RVD may be composed of a region which is not acquired by the basic video $V_k$ in the immersive video $V_{k-1}$ (in FIGS. 2a and 2b, a video region connected with arrows from $X_{k-1}$). $RV_{k-2}$ may be composed of a region which is not acquired by the basic video $V_k$ and $RV_{k-1}$ in the immersive video $V_{k-2}$ (in FIGS. 2a and 2b, a video region connected with an arrow from $X_{k-2}$).

When $RV_{k-1}$ to $RV_{k-2}$ are expressed differently from the viewpoint of image signal processing, $RV_{k-1}$ is an additional video composed of a region except for a video region overlapping with the basic video $V_k$ in the immersive video $V_{k-1}$ (in FIGS. 2a and 2b, a video region connected with an arrow from $X_{k-1}$). In addition, $RV_{k-2}$ is an additional video composed of a region except for a video region overlapping with the basic video $V_k$ and $RV_{k-1}$ in the immersive video $V_{k-2}$ (in FIGS. 2a and 2b, a video region connected with an arrow from $X_{k-2}$ or a region denoted by a rectangular dotted line within PVD (Packed video plus depth).

When a video region acquired at each viewing position overlaps a region acquired in another video, since the overlapping region is acquired and generated only once, it is possible to reduce the amount of data for transmission and compression. Meanwhile, the video regions in the RVD may referred to as occlusions which are not visible in the basic video $V_k$.

The RVD may be transformed into a PVD format, by packing the RVD into a smaller number of videos (one frame), for storage or transmission. The PVD may include metadata for describing a view position of each video region, a position in a region, a size, etc. in each RVD. The metadata may describe information when all video regions in the RVD are packed into the PVD, and may be included in a compression bitstream or a transport stream and transmitted to a terminal. A PV (Packed Video) may mean Atlas, Atlas Video or Atlas texture. In addition, the PVD may mean Atlas texture plus depth.

The PVD may be generated directly from a multi-view immersive video. That is, an optimal packing position is predetermined using video region information extracted through RVD generation (e.g., depth information of each video region or mask information determined based on the depth information), and the PVD may be packed directly from a multi-view based immersive video using the determined information.

For example, the PVD may be composed of texture information and depth information. In order to generate the texture information and the depth information, first, a region, in which RVD will be extracted from respective view videos $V_k$, $V_{k-1}$, ..., may be determined, using the cyclic process of FIG. 3. The region, in which RVD will be extracted, may be in the form of a mask indicating whether RVD is extracted per pixel (e.g., 1) or is not extracted (e.g., 0). The mask may be first packed into PVD for each view video, and the RVD is extracted from each view video using the packed mask value, thereby enabling direct packing into the PVD.

The metadata may be composed of a view number of each video region (a view position (view number) in which the corresponding video region is acquired with best quality), shared views (shared view position, a view position (view number) in which the corresponding video region is commonly acquired at the other view positions), priority (which is used to determine whether to perform transmission, a bit rate allocation, etc. when data capacity is limited and may be determined in order of view numbers of Shared_views), region information in the RVD, region information in PV (Packed video), a camera parameter of each view position, etc. In addition, the priority may be used to give a lower degree of importance than the occlusion, because the quality of an in-painted video region (an occlusion which is not acquired by an actual camera but is interpolated by signal processing) is relatively lowered. In addition, the priority may be the order of the view positions compared in order to extract a non-overlapping video region. For example, the priority may be the order of target or reference views when the non-overlapping region is extracted through a repetitive process as in the example of FIG. 3. The quality of the non-overlapping video region may vary according to the order of comparison, which, as a result, affects the quality at the time of terminal rendering. In addition, the priority may be used to indicate a view position corresponding to a representative illumination when the illumination is changed according to the view position (that is, the order of views indicating the relative degree of illumination of each view position), and may be used when referring to information on illumination change at the time of rendering. Here, the region information may include the position of the region and/or the size of the region.

Figure 3:
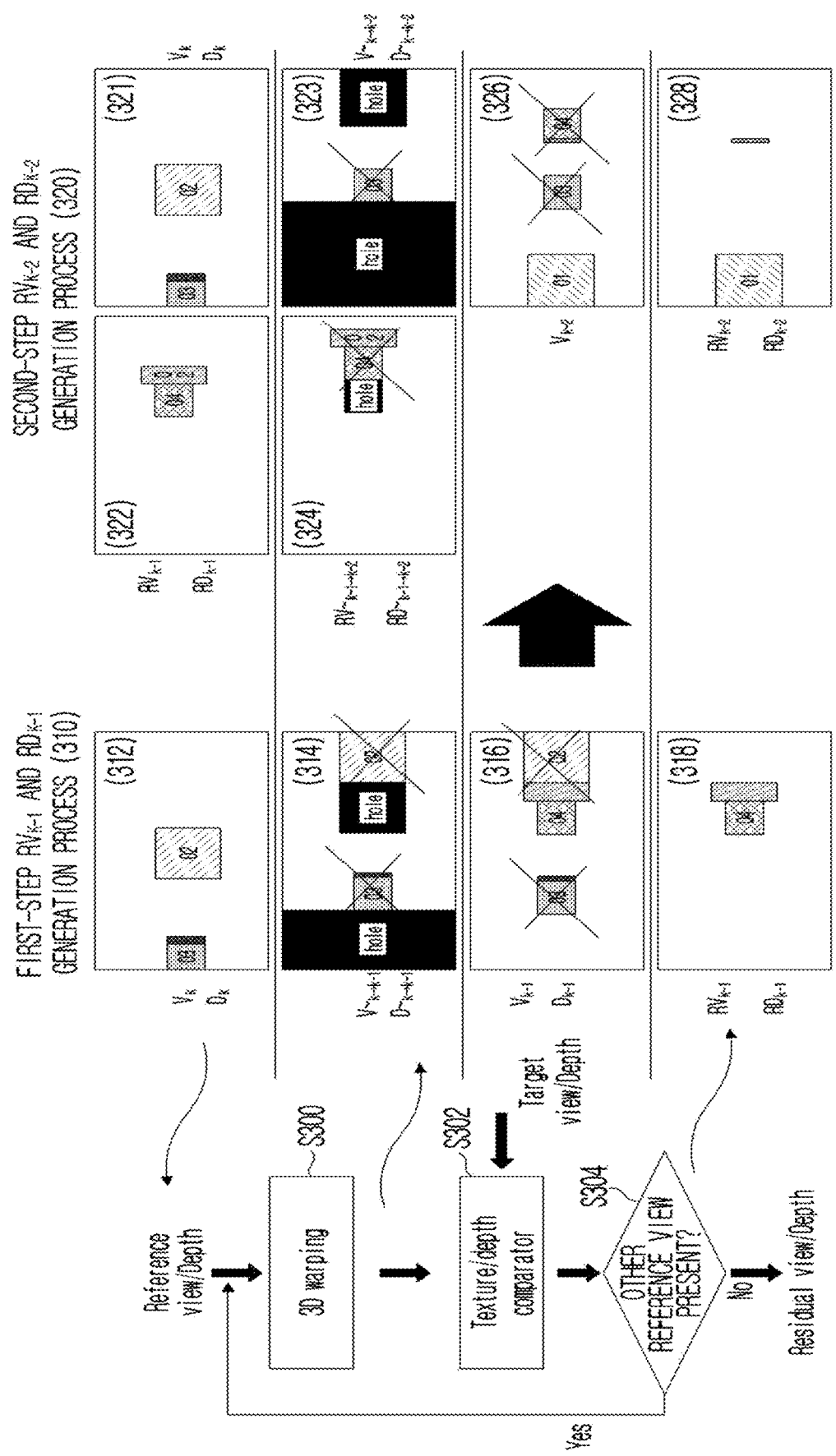
FIG. 3 is a view illustrating a process of generating RVD according to an embodiment of the present invention.

FIG. 3 is a view illustrating a process of generating RVD according to an embodiment of the present invention.

Referring to FIG. 3, in 3D warping step S300, all videos or depths for reference may be 3D-warped to target view positions, in order to remove redundancy. Specifically, the depth map of a reference view may be first warped using a camera parameter value and a video region may be warped based on the warped depth map. For example, the 3D warping process may include the following two steps.

As a first step, back-projection from a reference view image coordinate system onto a three-dimensional spatial coordinate system may be performed.

Equation 1 is an example of an equation for performing the first step and may be back-projected from the reference video V onto a three-dimensional space.

$$\begin{bmatrix} X \\ Y \\ Z \end{bmatrix} = P_K^{-1} \cdot \begin{bmatrix} x_k \\ y_k \\ z_k \end{bmatrix} \quad \text{[Equation 1]}$$

As a second step, projection from the 3D spatial coordinate system to a target virtual view image coordinate system may be performed.

Equation 2 is an example of an equation for performing the second step and may be projected from the back-projected 3D space onto $V_{k-1}$ which is a target view position.

$$\begin{bmatrix} x_{k-1} \\ y_{k-1} \\ z_{k-1} \end{bmatrix} = P_{K-1} \cdot \begin{bmatrix} X \\ Y \\ Z \end{bmatrix} \quad \text{[Equation 2]}$$

In Equation 2, in order to perform 3D warping with respect to the reference video which is two-dimensional array data, a depth value corresponding to a Z value may be additionally required. Alternatively, in some cases, a target view may be projected onto a reference view by the process of Equation 1 and/or Equation 2 above.

Meanwhile, P=K·RT, that is, a projection matrix P may be acquired using an internal parameter K and external parameters R and T of each reference camera obtained through a camera calibration process.

In order to remove redundancy, the process of generating the RVD may be repeatedly performed. Accordingly, the reference video may be at least one of multiple basic videos $V_k$ and $D_k$, view videos $V_{k-1}, D_{k-1}, V_{k-2}, D_{k-2}, \ldots$ other than a target view (hereinafter referred to as "(i) case") or RVD video, from which redundancy is removed in the previous process (hereinafter referred to as "(ii) case". For example, the reference video may be multiple basic videos and/or a view video other than the target view or RVD video, from which redundancy is removed in the previous process.

Referring to first-step $RV_{k-1}$ and $RD_{k-1}$ generation process 310 of FIG. 3, the reference video 312 is the basic video $V_k$ and, when the reference video is 3D-warped into the target view $V_{k-1}$, Object 3 (O3) and Object 2 (O2) are moved according to the depth value, and a region which is not visible in $V_k$ which is an original region may remain as a hole (314).

In texture/depth comparison step S302, the texture and/or depth values of the 3D-warped reference view videos $\tilde{V}_{k \to k-1}$, $\tilde{D}_{k \to k-1}$ 314 and the target view videos $V_{k-1}$ and $D_{k-1}$ 316 may be compared to determine similarity.

For example, when a result of comparing all pixel values in an arbitrary object is in a predetermined threshold range, these may be determined as the same value in the 3D space. In this case, since it is determined that the objects have redundancy, the objects (Object 3 (O3) and the front of Object (O2)) may be removed. In contrast, upon determining that the objects do not have redundancy (Object 4 (O4) and the side of Object 2 (O2)), the objects may be included in the RVD videos $RV_{k-1}$ and $RD_{k-1}$ (318).

In other reference view determination step S304, it may be determined whether there are several other reference videos.

Although a single reference video has been described above, if there are several reference videos, the overlapping regions between the reference views may be removed through a repetitive method based on the center view (e.g., $V_k$). The process may be confirmed in a second-step $RV_{k-2}$ and $RD_{k-2}$ generation process 320.

For example, the second-step $RV_{k-2}$ and $RD_{k-2}$ generation process 320 corresponds to the (ii) case, and is an example in which the RVD, from which redundancy is removed in the previous step, is input to a next step as the reference video, for repetitive redundancy removal. Specifically, after performing 3D warping from the reference view video $V_k$ 321 and $RV_{k-1}$ 322 generated in the previous process to the position of $V_{k-2}$, a region determined as the overlapping region through comparison with $V_{k-2}$ may be removed. That is, using the reference view video $V_{k-2}$ 326 and the 3D-warped reference view videos $\tilde{V}_{k \to k-2}$ and $\tilde{D}_{k \to k-2}$ 323 and $\tilde{RV}_{k-1 \to k-2}$ and $\tilde{RD}_{k-1 \to k-2}$ 324, a region, which is visible even in the other reference view videos, among the regions visible in the reference view image $V_{k-2}$ 326 may be determined. Accordingly, only Object 1 (O1) and a part of Object 4 (O4) remains in $RV_{k-2}$ (328).

In (i) case, as the reference view video, instead of $RV_{k-1}$ and $RD_{k-1}$ of the previous process, $V_{k-1}, D_{k-1}, V_{k-2}, D_{k-2}, \ldots$ which are original view videos other than the target video may be used. In addition, the number of repetitions may correspond to the number of reference view videos including the number of basic videos $V_k$ and may vary according to the target view.

The immersive video formatting apparatus may generate an RVD video and an additional information formatting unit may perform the above operation.

Figure 4:
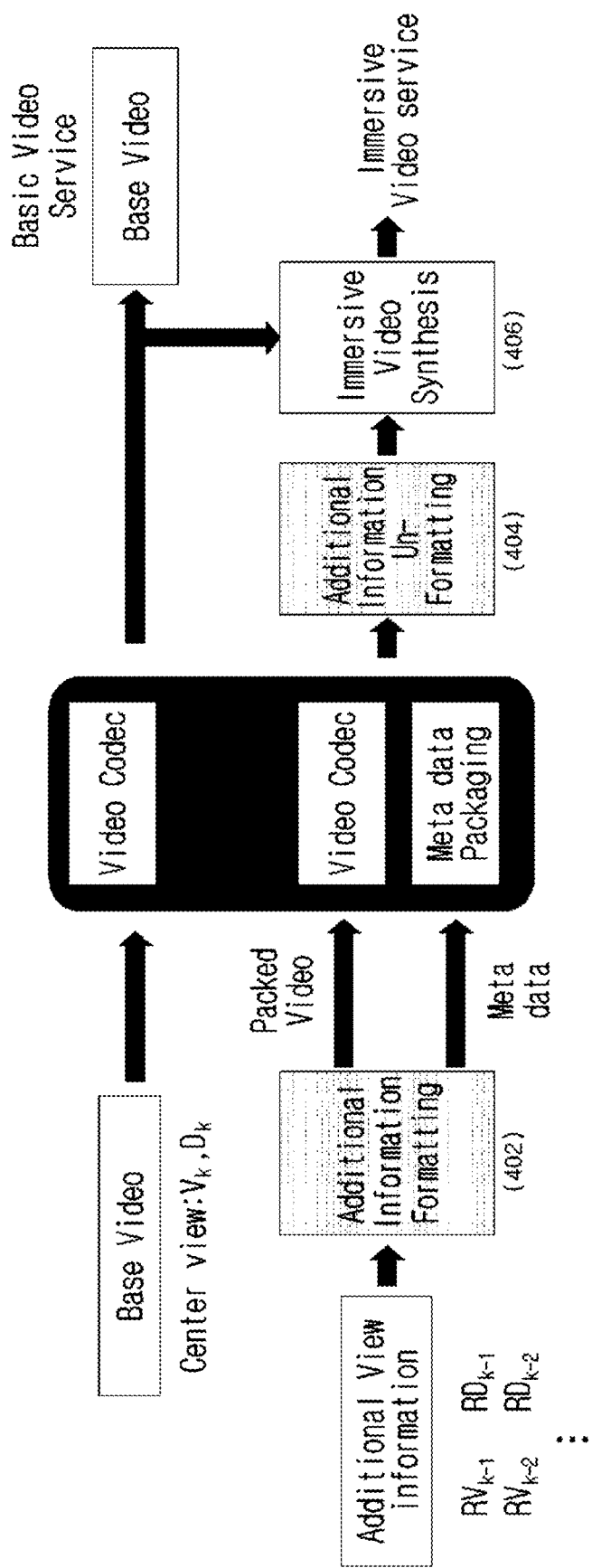
FIG. 4 is a block diagram illustrating a process of providing an immersive video service according to an embodiment of the present invention.

FIG. 4 is a block diagram illustrating a process of providing an immersive video service according to an embodiment of the present invention.

The basic videos $V_k$ and/or $D_K$ may be encoded through a conventional 2D video encoder (HEVC, VVC, etc.) and transmitted in the form of a bitstream, thereby providing a basic service such as UHD, 3DoF 360VR, etc. In contrast, as described above with reference to FIGS. 2a and 2b, the RVD is packed into PVD in an additional information formatting unit 402, and metadata related thereto may be encoded and/or packetized and transmitted to the immersive video terminal in the form of a bitstream, for example. An additional information un-formatting unit 404 may interpret metadata and separate the RVD from the PVD through interpretation. An immersive video synthesizer 406 may receive the viewing position of the viewer. For example, the viewing position of the viewer may be received from the position sensor, the touch, the keyboard, etc. of a terminal device such as an HMD or a smartphone. In addition, the immersive video synthesizer 406 may reproduce the video through a display, by dynamically synthesizing the view video corresponding to a user's viewport with reference to the basic video.

According to one embodiment, the PVD may be generated directly from the multi-view based immersive video. That is, after predetermining an optimal packing position using only depth information finally output in the RVD generation process (or mask information composed of binary pixels generated based on the depth information), packed video may be acquired by extracting the corresponding texture and/or depth from each original view video using the determined packing position.

The additional information un-formatting unit 404 may interpret information corresponding to the metadata according to the viewing position. In addition, the additional information un-formatting unit 404 may filter and separate video regions from the packed video using the interpreted information. The immersive video synthesizer may reproduce the video through the display, by receiving the viewing position of the viewer and dynamically synthesizing the view video corresponding to the viewport directly from the video regions with reference to the basic video.

In general, the view video synthesis process requires the large amount of memory and computation processes, by intermediately synthesizing the view video corresponding to the viewport from all the decoded view videos having original sizes. However, in the present invention, it is possible to reduce the amount of memory and computation processes, by intermediately and dynamically synthesizing the view video corresponding to the viewport from the video regions in the PVD.

Figure 5A:
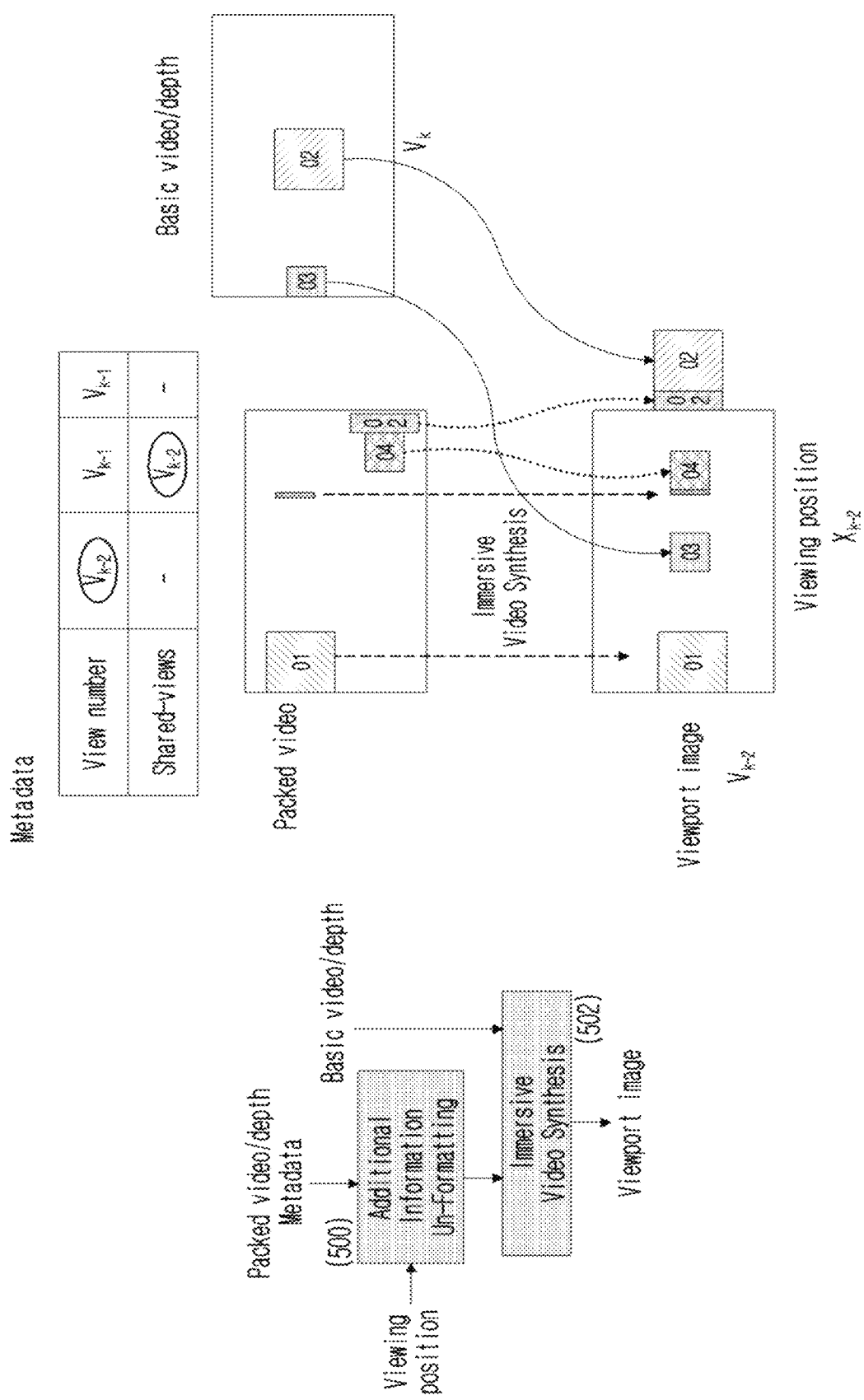
FIGS. 5a and 5b are views illustrating a process of reproducing an immersive video according to an embodiment of the present invention.
Figure 5B:
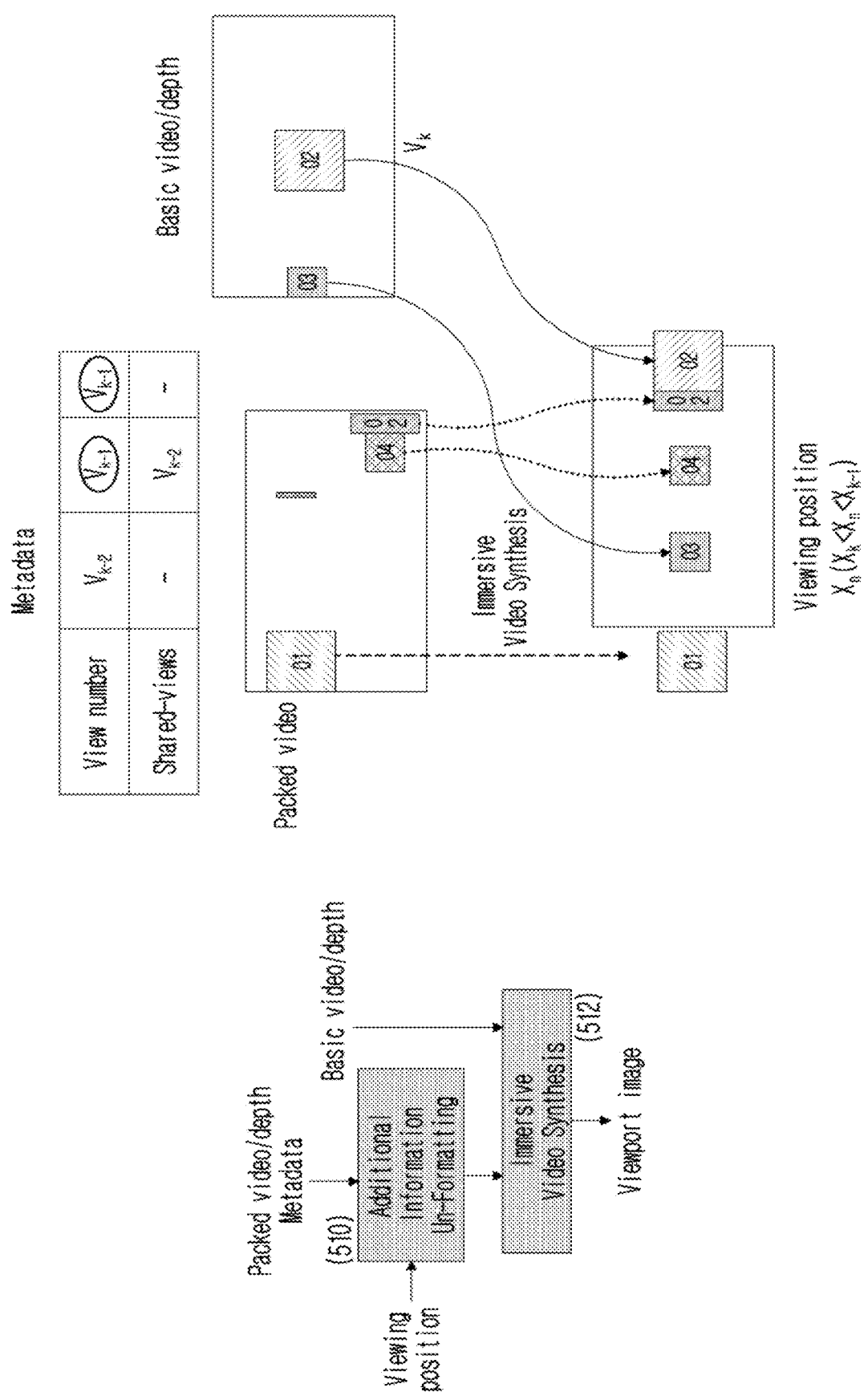

FIGS. 5a and 5b are views illustrating a process of reproducing an immersive video according to an embodiment of the present invention.

An additional information un-formatting unit 500 of FIG. 5a and/or an additional information un-formatting unit 510 of FIG. 5b may be an example of the additional information un-formatting unit 404 of FIG. 4. An immersive video synthesizer 502 of FIG. 5a and/or an immersive video synthesizer 504 of FIG. 5b may be an example of the immersive video synthesizer 406 of FIG. 4.

FIGS. 5 and/or 5b illustrate a process of synthesizing the immersive video in a terminal using the RVD. The additional information un-formatting unit 500 may interpret metadata transmitted from a server and extract a view number, shared views (denoted by an ellipse in FIGS. 5a and 5b), all video region position information in the PVD, camera parameters, etc., which match the viewing position of the viewer.

The immersive video synthesizer 502 may generate the RVD by filtering the video region from the PVD using the extracted metadata. In addition, the immersive video synthesizer 502 may synthesize the viewport image, by 3D-warping the basic video and/or the RVD with reference to the basic video $V_k$. When shared views are not included in the metadata, the shared views may be extracted from the PVD or RVD, by determining a video region necessary for viewport image synthesis at the viewing position using the camera parameter and/or the depth value.

FIG. 5a shows an example of a process of synthesizing the video at the position of the reference view $V_{k-2}$ using the basic video $V_k$ and the RVD. First, 3D warping to the target position $X_{k-2}$ may be performed using the basic video and the depth map corresponding thereto. Object 3 (O3) may be mapped by determining the position thereof according to the depth. Object 2 (O2) is not mapped within the viewport in $X_{k-2}$ and thus is not visible, although warping is performed. When 3D warping from the basic video is performed, the texture of a region which is not visible in the basic video but is visible in $X_{k-2}$ should be generated. In order to generate the texture, a reference view most suitable for bringing texture information remaining as a hole region through backward mapping (or backward warping) by referring to a 3D geometric relationship. In FIGS. 5a and/or 5b, the candidates of the reference view may be $V_{k-1}$ and $V_{k-2}$. A partial region (texture) of the image visible at each reference view is in the RVD and definition thereof is in the metadata ($V_{k-2}$ in the example of FIG. 5a and/or 5b). Therefore, $X_{k-2}$ may be completed by performing backward mapping. In the embodiment of FIG. 5a and/or FIG. 5b, Object 4 (O4) and Object 1 (O1) may be mapped to a target viewport image $X_{k-2}$.

FIG. 5b shows an example in which a target view image $X_k$ is located between the basic video $V_k$ and the reference view $V_{k-1}$. Object 2 (O2) may be mapped from the basic video $V_k$, and the side portion of Object 2 (O2) is mapped from the RVD to be visible in the viewport image. In contrast, Object 1 (O1) is not mapped in the viewport region and thus is not visible in the viewport image. In addition, since the target view image is located between $V_k$ and $V_{k-1}$, a portion where Object 3 (O3) and Object 4 (O4) are visible in the video region may be changed.

According to the present invention, it is possible to provide an immersive video formatting method and apparatus for supporting motion parallax.

According to the present invention, it is possible to provide a method and apparatus for providing a complete and natural stereoscopic image to a VR device, by reproducing an image corresponding to up/down/left/right movement of a viewer as well as up/down/left/right rotation of the viewer.

According to the present invention, it is possible to provide a method and apparatus for an immersive video generation format and playback for supporting motion parallax while maintaining compatibility with a basic immersive video service such as UHD or 3DoF.

According to the present invention, it is possible to provide a method and apparatus for effectively providing a large amount of immersive videos, by transmitting a minimum additional video and metadata.

Effects obtained in the present disclosure are not limited to the above-mentioned effects, and other effects not mentioned above may be clearly understood by those skilled in the art from the following description.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a machine language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. An immersive video formatting method, comprising:
determining whether or not a current view is a basic view;
when the view is not the basic view, determining a reference view of the current view among multiple views;

obtaining a residual view of the current view by removing redundancy, between the reference view and the current view, from the current view;
extracting a rectangular data unit which comprising residual data included in the residual view;
generating an atlas by packing the rectangular data unit; and
generating a metadata for the atlas,
wherein the metadata comprises:
source view information identifying the current view from which the rectangular data unit is derived,
priority information used to determine whether or not the current view is the basic view;
shared view information specifying the reference view of the current view,
packed position information specifying a location of the rectangular data unit in the atlas, and
source position information specifying a location of the rectangular data unit in the current view.

2. The immersive video formatting method according to claim 1, wherein the current view is an omnidirectional video or a planar video generated by projecting the omnidirectional video on a 2D plane.

3. The immersive video formatting method according to claim 1, wherein determination of whether the current view is the basic view is based on a size of overlapping regions with other views.

4. The immersive video formatting method according to claim 1, wherein the method further comprises:
determining a number of reference views,
wherein when the number is determined plural, a plurality of the reference views comprises a basic view and an additional view, the additional view being pruned by the basic view before pruning the current view, and
wherein when the number is determined plural, pruning the current view is repeatedly performed by using each of plurality of reference views.

5. The immersive video formatting method according to claim 1, wherein the residual data comprises a region, which does not overlap with the reference view, in the current view.

6. The immersive video formatting method according to claim 1, wherein a pixel which a depth value is less than a threshold value in the rectangular data unit is determined as an invalid pixel.

7. A method of synthesizing immersive video, the method, comprising:
decoding an atlas metadata from a bitstream;
determining whether a current view is a basic view or not;
when the current view is not the basic view, determining a reference view of the current view among multiple views;
extracting, based on the metadata, rectangular data units of the current view and the reference view from the atlas; and
reconstructing the current view based on the extracted rectangular data units,
wherein the metadata comprises:
source view information identifying the current view in which the rectangular data unit is included,
priority information used to determine whether the current view is the basic view or not;
shared view information specifying the reference view of the current view,
packed position information specifying a location of the rectangular data unit in the atlas, and
source position information specifying a location of the rectangular data unit in the current view.

8. The method according to 7, wherein the method further comprises:
determining a number of reference views,
wherein when the number of reference views is determined plural, a plurality of the reference views comprises a basic view and an additional view, and
wherein the additional view is not the basic view and is pruned by the basic view.

9. The method according to claim 7, wherein, a pixel which a depth value is less than a threshold value in the rectangular data unit is determined as an invalid pixel.

* * * * *